United States Patent [19]
Banner

[11] 3,721,007
[45] March 20, 1973

[54] NAVIGATION CALCULATOR
[76] Inventor: Philip M. Banner, 28 Oxford Road, Massapequa, N.Y. 11758
[22] Filed: April 13, 1970
[21] Appl. No.: 27,535

[52] U.S. Cl..........................33/1 SD, 33/356, 235/78
[51] Int. Cl..........................G01c 21/20, G06c 27/00
[58] Field of Search........33/1 SD, 75 R, 224; 235/78

[56] References Cited
UNITED STATES PATENTS

| | | | |
|---|---|---|---|
| 499,087 | 6/1893 | Baker | 33/224 X |
| 2,904,885 | 9/1959 | Wood | 33/75 R X |
| 2,105,103 | 1/1938 | Sinitzin-White | 33/1 SD |
| 2,548,319 | 4/1951 | Osterberg | 33/1 SD UX |
| 1,226,141 | 5/1917 | Sterling et al. | 33/75 R |
| 2,545,935 | 3/1951 | Warner | 33/1 SD UX |

FOREIGN PATENTS OR APPLICATIONS
28,684    3/1918    Norway..................................33/75 R

*Primary Examiner*—Robert B. Hull

[57] ABSTRACT

A navigation calculator comprising a base plate having angular markings, a plurality of round members rotatably mounted on said plate and on each other, each of the round members being adapted to be moved to insert the navigation parameters such as magnetic variation, compass deviation, compass reading, current direction and wind direction so that the various parameters are added to give a final reading.

A pair of protractor arms are adapted to be rotatably mounted on top of the stack of round members for drawing a course on a chart.

3 Claims, 9 Drawing Figures

PATENTED MAR 20 1973 3,721,007

INVENTOR.
PHILIP M. BANNER
BY

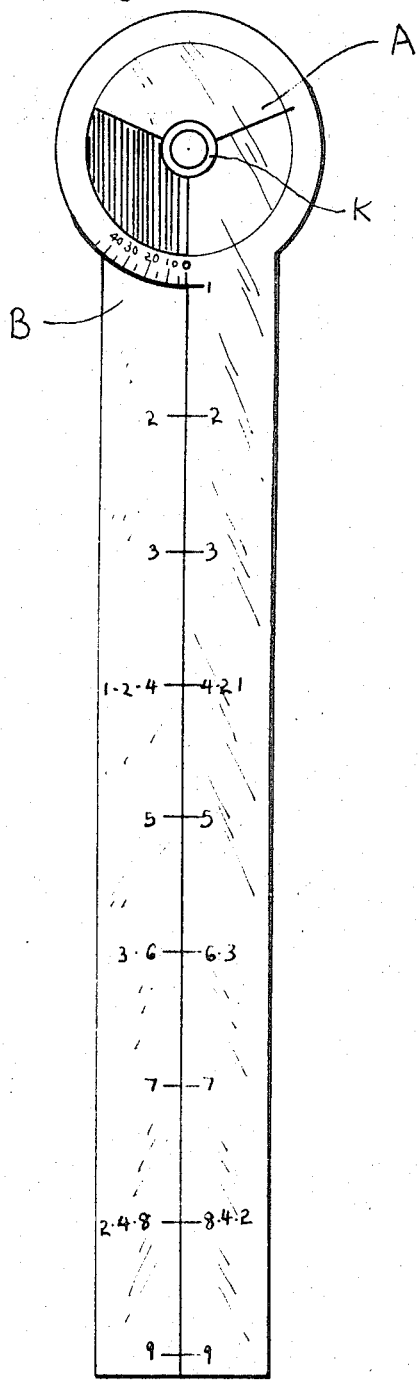
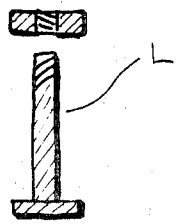

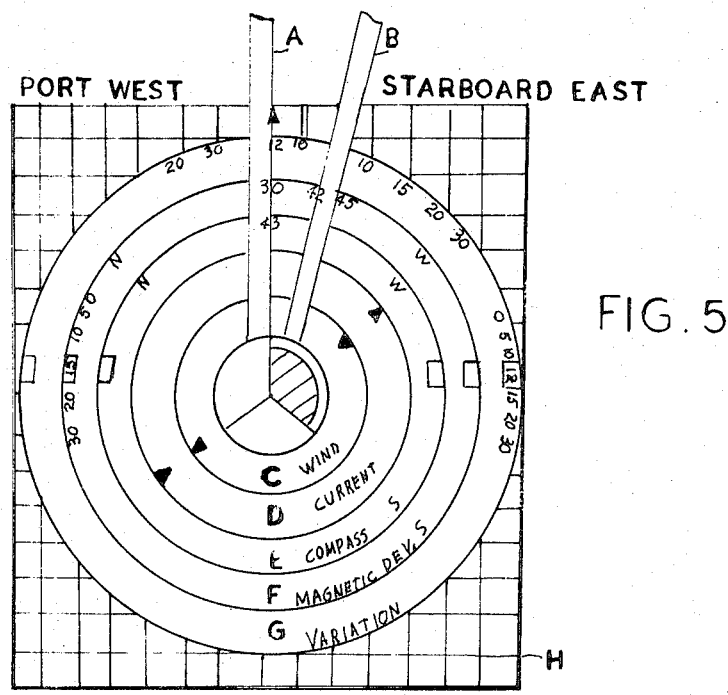

INVENTOR.
BY PHILIP M. BANNER

NAVIGATION CALCULATOR

This invention relates to a nautical navigation calculator that incorporates various methods of assistance to navigators, particularly to small boats, ships and airplanes and wherever magnetic compass equipment is used. It has been designed to facilitate rapid reading of important information relative to marine or air navigation and assisting in various teaching methods. Too often, the operation of a boat becomes a responsibility where the navigator is confronted with a last minute crisis, necessitating an immediate analysis and decision regarding safety, direction of travel, winds, currents, deviation and variation, position finding, distance plotting, and other factors which are all embodied in this calculator and inseperably a part of basic navigation.

The calculator will help those seeking to acquire the art of navigation at a time when we have 47 million registered boats in the United States, and the number keeps increasing rapidly in this leisure recreational sport of boating. No one can really expect the inexperienced small boat operator or skipper of a new sailboat to have the expertise or training given to the professional navigator in airplanes or ships, but the number of small craft accidents and equipment damage resulting from poor navigational habits suggests an immediate need to educate or re-educate the operators. Faster operating equipment and the greater interest in speed adds to the difficulty where in some cases boats have proceeded too far, entered dangerous areas, gone aground on bars, traffic problems danger resulting from lack of knowledge of rules of the road, or just did not have a simple practical way to calculate the deviation and other factors which this instrument does, besides providing means of double checking the information. This calculator offers an efficient course finder wherein the course arms easily make it apparent which course is required. The two course arms have been bisected to allow both of its inside edges to represent the true center line while any movement of one part from the other automatically measures the amount of movement in degrees. As I will point out and explain, it also assists the navigator with marine rules of the road—rules concerning lights at sea and position finding through bow and beam bearings. It allows a simple analysis of different courses, compass, magnetic and true bearings, showing effect of wind and currents upon the course of movement. Its base has been designed to meet the specifications of accepted form of plotting procedures.

The base has a lubberline for plotting. One method features the point system, where the value of each individual point is 11¼° and there are 32 points around a compass. This corresponds to the use of trigonometry in position finding methods, drift calculation, safety and lighting at sea as referred to by all present or old accepted standards of navigation. I refer to American Practical Navigator (Bowditch), published by the U. S. Naval Oceanographic Office, or C. Chapman M.E., whose works are published in Motor Boating Courses. Another part of the base has the 32 points clearly marked completely around its periphery, allowing their use on both halves of the different parts. The other part of the base has been marked differently to conform to the present method of accepted course plotting also. Reference is hereby made to the Victory Leeway Calculator, where table 1 Bowditch shows angularity of one to four point courses for distances as far as one is likely to use in the ordinary along shore navigation. The base of this calculator facilitates this operation while the other part serves equally another important function in adherence to points used in position finding through bow and beam bearings. All magnetic compasses are divided into 32 equal parts, each having a name representing 360°.

These and other important features of the invention will now be described in detail in the following specification, naming each part and describing its function as shown on the drawing, then pointed out more particularly in the appended claims.

A principal object of the invention is to provide new and improved navigation calculator means for a craft.

Another object of the invention is to provide new and improved navigation calculator means which are simple in construction, and which provide means for adding navigational parameters such as magnetic variation, compass deviation, compass reading, current direction, and wind direction, so that all of said parameters are added up automatically to give a final reading.

Another object of the invention is to provide new and improved navigational calculator means for a craft comprising a base plate adapted to be mounted on a craft, said base plate having angular indicia radiating from the central point of said base plate, a first round member rotatably mounted on said base plate on said center point, said first round member having angular indicia thereon, a second round member smaller than said first round member rotatably mounted on said first member, said second member having angular indicia.

Another object of the invention is to provide new and improved protractor arm means which are adapted to be rotatably mounted on top of the calculator for locating and drawing chart courses.

These and other objects of the invention will be apparent from the following figures, of which:

FIG. 3 shows a top view of the protractor arms.

FIG. 4 is a detail view of bolt securing means.

FIGS. 5 and 6 are diagrams illustrating the use of the invention.

Problem: Example No. 1, FIG. 5

Figure 1:
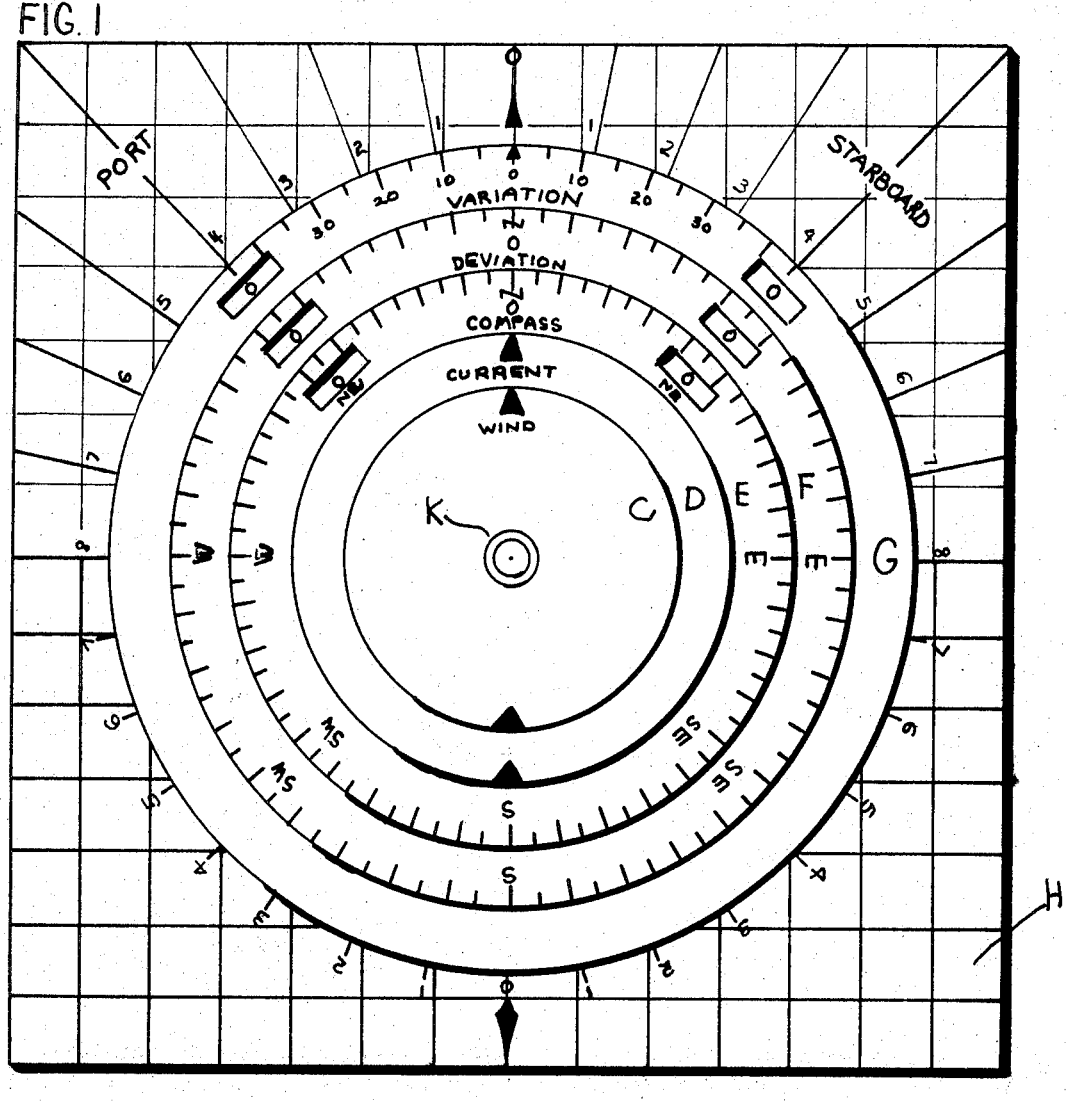
FIG. 1 shows a plan view of the calculator.
Figure 2:
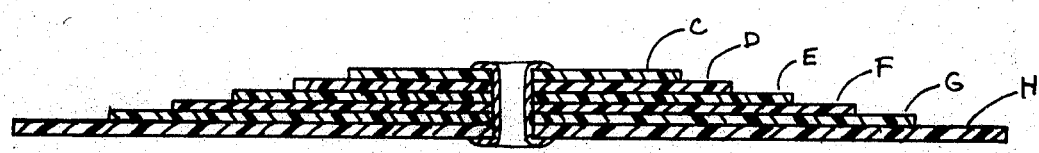
FIG. 2 shows a cross-sectional view of FIG. 1.
Figure 7:
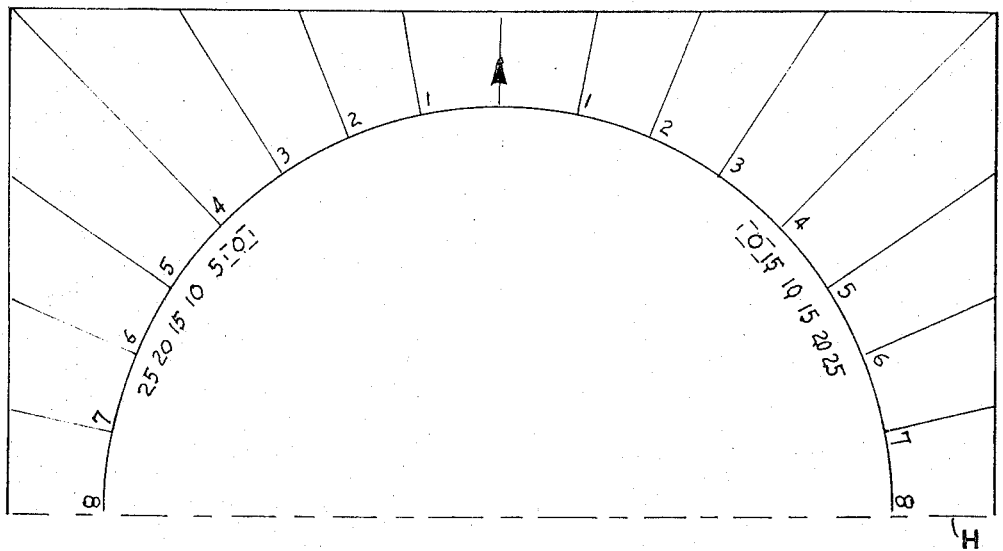
FIGS. 7, 8 and 9 are detail views of the dials (omitting the cutouts).
Figure 8:
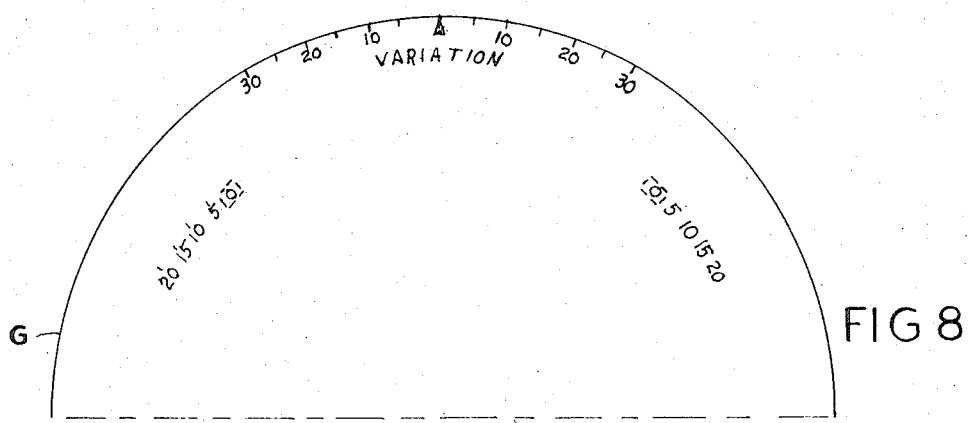
Figure 9:
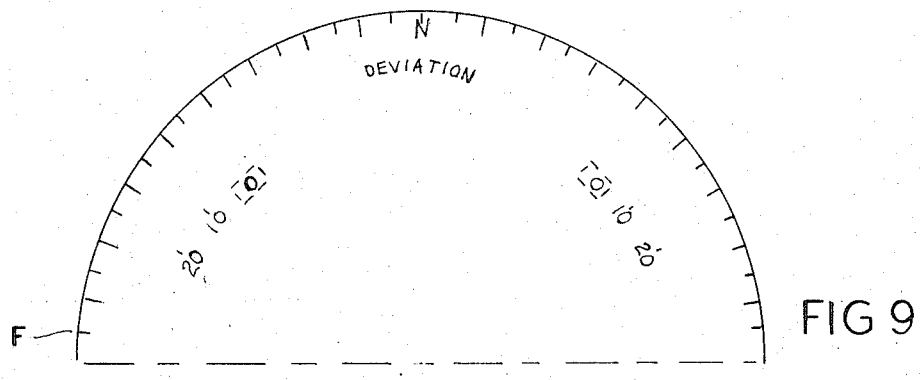

True course is desired. Compass course is 45°. Deviation is 15°W. Variation is 12°E. Wind is from the West 90°. Current is from the East 90°. Current magnitude equals wind magnitude effect.

Procedure: Example No. 1 (containing the unusual variable of variation and deviation being in different directions)

1. Set dial assembly so compass dial E reads 45° on base H.

2. Set dial F (magnetic deviation bearing) so that the readout is 15° Port (west). This will place 30° setting of part F on the lubberline.

3. Set dial G to read 12° in starboard readout (east).

4. At zero degrees on part G (at the true north sign) read directly under on scale F below the answer, 42°.

Problem: Example 2, FIG. 6

Compass course is desired. True course 110°. Variation 15°E. Deviation 12°E.

Procedure: Example No. 2

1. Set dial F to 110°.
2. Set dial E the same as F and then rotate readout on starboard side (east) until the combined total of both factors variation 15° and deviation 12°, total of 27° reads in E dial (compass).
3. Read answer on E dial lubberline 83°.

Course Arms A and B

When arms A and B are used, B is placed over the lubberline and A is utilized to find courses, make corrections, plot wind and currents while any angle between the two is recorded on the base of these parts in degrees. This calculator provides a triple check of data: 1. by degrees or directions on dials; 2. by readout information on all dials in degrees; 3. by the arms A and B which can determine the degree of angle and triple check all information.

Suppose we are on a boat headed east. The compass dial E is set on the lubberline L to the arrow on the base. Next you turn the deviation dial F (magnetic bearing) to the proper allowance by referring to a deviation chart, if available, or by the use of the plotting arms, finding fixed reference on shore or at sea, and measuring same on the degree scale of the arms, then placing this information onto the deviation scale. Now we must refer to a navigation chart and determine the variation and place this dial G properly on the lubberline also. You will take note that each of the dials E, F and G have readout on both the port and starboard sides, therefore measuring every movement of each of these three dials. Now that we have lined up the three dials associated with the compass, we can adjust our course by the number of degrees of difference shown in the readout boxes provided. Suppose deviation were 15° port and variation were 12° starboard. This example would be handled by subtracting variation from deviation and finding a remainder of 3° port side. The adjustment for a true course is made to the boat compass by 3° port side which changes the heading of East to 3° to the North.

Suppose you are heading the craft northeast by the boat compass and you wish to head north. You turn the calculators compass dial E until the readouts show zero and you are now on a north compass course. In changing the deviation, the same rule is applied. You can use the lubberline L or the readout, whichever is most convenient for the navigator.

Suppose we are headed northeast and the plotting arms A and B, FIG. 3, are placed over the direction of travel and in scanning with these arms we find that the apparent course is 45° easterly. This is read on the part of the plotting arm A, and we now change each dial accordingly. If the deviation and the variation are the same as when northeast, we will now be heading north. Each of the dial readouts will be back to zero.

In using the base containing the point scales, we can now find our position by the bow and beam method. Reference is directed to "Piloting, Seamanship and Small Boat Handling" 1969-70 edition by Chas. Chapman, M.E., published by Motor Boating, page 352 (i) wherein BOW AND BEAM BEARINGS or DOUBLING THE ANGLE ON THE BOW both refer to the beam method. Further example is hereby directed to a simple position locator, easy to use, and merely requires a knowledge of points. Figure 218 page 115 Volume V by Chas. Chapman, M.E. refers to an easy method of applying the compass points to position locating. Bow and Beam bearings can best be described as successive relative bearings (right or left) of 45° and 90° of a fixed object.

When using all the parts of this invention, additional scales become very useful in assisting the navigator. After the compass, deviation and variation factors are placed, the pilot can set the wind and current dials according to the direction they are coming from and affecting the direction of the craft. Suppose you are on an easterly course. You determine the wind being from the west, you add the estimated effect of the speed to the speed of your boat, and note that the direction of the wind will not affect your course sideways. Next you set the current dial, for example, from the east. You then deduct the speed of the current and note that it is coming from the direction you are traveling and watch for changes. If the current or the wind were coming from any angle, the estimation would be made to change the course accordingly. In any event, the wind and the current are two very important factors which must be considered by the pilot in determining his course. In this arrangement of information, this invention calculates all the factors necessary to facilitate safe travel. The base H contains a point system that can be utilized for wind and current plotting.

The plotting arms A and B contain a safety feature. The arm A has imprinted upon it a pattern like that used in "Rules of the Road". Ten points to the right of the bow are red colored to designate the danger zone. This is from the dead ahead position to 2 points abaft the starboard beam. A boat is divided into 32 equal parts and each has a name. Although it is nice to know all the names, the most important are those from dead ahead to 2 points abaft (behind) the starboard (right side) beam. These 10 points are known as the danger zone. Any boat coming towards your danger zone has the right of way, and you must keep out of his way. At night your green light shows through this zone. In addition to this, arm A has a line drawn on the port side to show 10 points where the red light shows when lit. White bow lights are required for 20 points and a white light at the stern is required for all 32 points. The base of this invention specifically shows the points at all 32 places where they belong and this too will allow a pilot to immediately determine the safety and lighting of vessels.

I would like to point out the importance of the readout facility offered by this invention. Whether either side of the base is used, the difference of movement of dials E, F, G will show in degrees the amount of movement. This is also accomplished by comparing each of the respective dials and their position in degrees, and this is also checked again by the course arms A and B. Therefore, this invention can actually check out these important calculations three ways.

The arms A and B are quite different from those of the prior art in that they measure an angle or a course from either of the inside edges. Instead of having to use a sharp point to denote (mark) center or to see the center in the middle of an arm and making the second mark, you merely use either arm for present course and set the other arm for apparent course and either edge will display the true center for marking purposes. This offers a simplified method and in addition to all this, the arms A and B record a reading of degrees of difference between the various positions they are placed in up to any number of degrees that may be required. For illustrative purposes, 45° have been shown.

The drawings illustrate the navigational calculator shown in FIG. 1. The device will consist of a heavy plastic base H upon which are mounted five concentric circles C, D, E, F, G and having mounted on top two course protractor arms A and B. The joining of the above stated parts may be accomplished by use of grommets or other like means K and a bolt L and nut designed to keep all the parts in close tolerance. The parts of this invention would be best suited by being made out of plastics or other economical means that would resist dampness and other conditions around the water.

In FIG. 3, arm A represents one of the course arms that measure course changes in degrees. It has an imprinted nautical scale upon it, corresponding in miles to the various distances and scales used on all navigational maps, produced by the U. S. Department of Commerce Environmental Science Service Administration and by the MacMillan Marine Atlas. Interest is directed to the particular instances which include the normally used scales—1/80,000, 1/40,000, 1/20,000. Arm A is termed the primary arm because it contains a scale in degrees on its base showing the exact degree of difference between the measurement made by both arms.

Arm B is the secondary arm which when moved exposes the number of degrees difference between the two arms. If used separately or between different measuring points it provides an alternate (apparent) course for the navigator.

Arms A and B are secured together by a grommet or rivet, or grommeted with all the other parts as to permit free and accurate movement. FIG. 4 shows a bolt L assembly so designed to permit all of the plastic concentric circles with the arms A and B to be locked together. It contains a shoulder and cap-nut and can be tightened by spacing washers and a spring. This would permit removal of arms A and B from the rest of the calculator for drawing purposes or for individual use for measurement of angles on different course plotting.

Arms A and B, FIG. 3, were designed to permit maximum plotting area by having the leading edges facing each other, not to interfere with drawing a second line and not having to move the instrument to accomplish this; also not having to place point markings nor mark the center points of protracting arms which are usually required on present devices. Both arms when in a closed position will equally share the same line as if drawn from either one. This allows greater accuracy in plotting an apparent course. Having leading edges abutting and facing each other allows greater use of the arms A and B in that the two arms do not overlap, wasting valuable plotting area. Another important feature of the arms A and B assembly is its capacity to measure the difference in angle between the arms at any points that it may be placed around the 360° of the compass. It can also be used to measure the points at 11¼° markings around the 360° scale on base H that may be used in coordination with locating position, allowing for wind or currents where point systems are used. As one arm intersects the other, it measures an angle. Therefore, this would permit unrestricted use in measurement of directions, deviation, distances and speed as well as other uses afforded by this calculator.

Arm A contains a safety dial conforming to points used in "Rules of the Road" and boat lighting requirements by points. In addition to this, it shows the danger zone where others have the right of way. Knowledge of this, particularly keeping this information in front of people will acquaint and remind them to observe the navigation rules.

FIG. 1, Dial C, Wind

Leeway is the leeward motion of a vessel due to wind. It may be expressed as distance speed or angular difference between course steered and course through the water. However expressed, its amount varies with the speed and relative direction of the wind, type of vessel, amount of freeboard, trim, speed of the vessel, state of the sea and depth of the water. Leeway is most conveniently applied by adding its effect to that of the current and other elements introducing geographical error in the dead reckoning.

Specifically, dial C actually shows the two important reference points in the form of arrows designating where the wind is blowing from and where it is blowing to. In order to calculate the effect of wind, first set the compass and deviation and variation dials properly, then alter the setting according to the estimated effect of the wind upon your particular vessel. This information will immediately bear significance to the user, who usually measures or estimates the effects and is reminded to make this valuable computation. Reference is made to table 1 of Bowditch, the navigator's bible, showing angularity of one to four points for courses one is likely to use in alongshore navigation. It is intended as an aid for quick calculation of the allowance to be made for any force such as tide, wind or sea, which will tend to set the ship sideways on her course and can be used for ordinary amount of leeway for distance up to 25 miles or on a per hour basis for longer distances.

FIG. 1, Dial D, Current

This is also unquestionably another valuable calculation the navigator must render. According to present practices, the following would denote an entire common sense approach to be used with this dial D, which rapidly determines for wind allowances. Dial D shows the direction of the current, where it is flowing from and where it is flowing to. A navigator could estimate rather closely by observation the effect upon his vessel. For example, suppose you are heading north and the current dial shows the current from the west, one would easily observe on dial D the obvious effect. Even if the current were oblique from any direction and the navigator could estimate the current speed and the boat speed he would effectively estimate the result. There are two factors in this calculation, one the real course, and the other the apparent course, which will compensate the effect of current or wind pressure on the boat. However, for those who prefer a formula for

FIG. 1, Dial E, Magnetic Compass

This dial relates to the magnetic boat compass, designating cardinal and intercardinal points on a 360° scale. The compass shows the direction of heading. Its center is always in line with the keel or lubberline L. This magnetic compass when used with other parts of this calculator provides a means of correcting magnetic bearing caused by polar deviations or by influences within the ship, such as the use of the wrong type of compass such as an airplane compass on a boat, chrome plating causing a magnetic field, steel or electric welding near the compass, improper installation of electrical equipment near the compass, untwisted or shorted wiring, improper storage procedures, etc. A magnetic compass is subject to inherent limitations since it responds to any magnetic field. It is also affected by the change in the local magnetic situation. The undetected presence or change in position of magnetic material near the compass may introduce an unknown error. Thus, an error may be introduced by a steel wrench or a paint can left in the vicinity of the compass. A pocket knife or small keys are sufficient to affect the compass if brought as close as they are when on the person of an individual standing by the compass. Nylon clothing may introduce an error, the earth's magnetic field, etc. Another consideration of importance is the positioning of a marine engine or engines where installations of iron and steel affect the compass in each direction differently. The navigator places the compass on the calculator in line with the lubberline arrow, according to the direction shown on the boat compass. This part E has two sight holes conveniently located in both port and starboard sides. This will show the degree of movement on this dial from the center position. If one wanted to move this compass for any adjustment or allowance it could be accomplished by moving it until you reach the desired amount of degrees shown in the sight hole, or by watching the degree marks upon the outer edge of the compass dial. The information seen through the sight holes are the corresponding numbers on the next dial F.

FIG. 1, Dial F, Deviation

This is the magnetic bearing. It is a compass rose having the same design, information and significance as dial E, having a 360° scale and cardinal and inter-cardinal points. The explanation given referring to dial E dealing with interferences that cause deviation are all regarded as the deviation factors where there is such great difference between the magnetic compass and the magnetic bearing. Once the deviation is known, it is then applied to this deviation dial. This part also has two readouts that are imposed on the dial G, the next dial under it. It can also be adjusted by the readout in degrees. If the pilot does not have a deviation recorder, he will take a fix on different objects which will correct the deviation. Many boats are equipped, and all using a magnetic compass should be, with a compass deviation card where the angle between the magnetic meridian and the axis of a compass card is recorded. Finding the deviation is best accomplished with the vessel on magnetic headings. The compass being adjusted cannot be used for placing the vessel on a desired magnetic heading because its deviation is unknown, and is subject to change during the process of adjustment. A number of methods are available including use of (1) another magnetic compass of known deviation, (2) a gyro compass, (3) bearing of a distant object, (4) azimuth of a celestial body. Magnetic compass deviation at the desired magnetic heading is determined from the deviation table for that particular compass and applied to the magnetic heading to determine the equivalent compass heading. If the deviation on some headings is large, the desired action is to reduce it, but if this is not practicable, a separate deviation table for compass heading entry may be useful. This may be made by applying the tabulated deviation to each entry of magnetic heading, to find the corresponding compass heading, and then interpolating between these to find the value of deviation at each 15° compass heading. Thus, deviation is the angular difference between magnetic north and compass north.

Example: A vessel is on a course 225° true, the deviation is 2° west, the variation in this area is 88° west;

True heading 225 deg.
    8 deg.variation West, turn dial G to 8 deg. West
    233 deg.magnetic heading, turn dial F to 233
    2 deg.W deviation
    235 deg.compass heading, turn dial E to 235

Arms A and B are then used to scan the map for double checking or new course.

Compass error is 8° W plus 2° W equals a total of 10° W. It is well to bear in mind the result of sailing off course. With a 10° error, the vessel will be set off course 1 mile for every 5.7 miles run. This would be serious when making a landfall in poor visibility. More hazardous are the risks of stranding when running a narrow channel through shallow water in fog or or heavy rain. The small craft sailor is constantly operating his craft in narrow channels and very shallow areas where the preciseness of navigation is required to avoid equipment damage or safety in passing through such areas, where deviation and every factor becomes important. Today there are more and more pleasure boats responding to the art of taking trips, sometimes to far off islands where variation and deviation and true headings are absolutely necessary to safe journey. Electric windshield wipers can cause a drastic change which must be taken into consideration with other items causing deviation.

FIG. 1, Dial G, Variation

This partially marked dial, showing 45°, or more if desired, represents the course relative to true north, the direction of the north geographic pole. This calculator has now made three references to direction, on three different circular discs, E, F, and G, plus the effect of current and wind dials D and C, which also effect the line of travel. The subject of deviation concerned itself with dials E and F. Now we are concerned with compass error, which is the angular difference between true north and compass north (the direction north as indicated by a magnetic compass). The angle between geographic and magnetic meridian, compass error and variation are the same. The three methods by which bearings may be expressed are:
1. True: when they refer to the north geographic pole;
2. Magnetic: when they refer to the north magnetic pole. To change magnetic courses to true courses, the former must be corrected for variation ... Dial F (deviation, or magnetic bearing);
3. Compass: when they refer to the particular boat compass on each particular heading and must be corrected for both deviation Dial F and variation, Dial G, for conversion to true bearings or true courses.

The earth's lines of force do not run as great circles passing over the earth and through the magnetic poles but change their direction over the globe, making many different angles with true meridians. Hence, variation differs with locality and the navigator must take into account the change in variation as he proceeds upon the voyage. For example, on the course of the great circle from New York to Liverpool, the variation changes over 10° in 600 miles. Off the coast of Florida, the variation is zero. An aviator or boat operator departing from Florida to Nova Scotia would, if he failed to take the change in variation into consideration, find himself not in Nova Scotia, but lost in the woods over Maine. Variation not only changes with locality, but generally changes its value slowly in any given place. In piloting and small boat handling, the mariner finds upon the chart not only the value of the variation, but the rate, the amount and direction of the annual change given upon the compass rose. By checking a chart or determining a fix of shore objects the mariner can adjust his direction accordingly, and proceed on a safe journey with minimum loss of time. This particular part of the calculator, dial G, can save time in figuring a course where usually the pilot must refer to the charts for true bearing, when here it is indexed in rotation, like the rose on the charts, offering a complete picture to the navigator. Even after being removed from the map area, the calculator serves the pilot with the recorded information for further reference analysis while enroute. The variation is determined by reference to local charts and the operator of the calculator adjusts the true north disc G, FIG. 1, to the left or right of the centerline mark (lubberline) according to the number of degrees of variation easterly or westerly or port or starboard. This dial G, FIG. 1, having a 90° scale upon it interpolates with the other scales for exact measurement in degrees. It is broken down to two 45° scales, one on each side of the lubberline. You will note the readout facility also afforded to this dial G as to E and F. The information is printed on dial H, FIG. 1 as seen at the cut out portion of dial G.

FIG. 1, Dial H, Calculator Base

This base consists of heavy plastic material plate upon which are mounted the five concentric discs and the course plotting arms A and B, FIG. 3, each earlier discussed in parts respectively. This base serves more than one purpose. It has a direction pointer indicating the lubberline L and direction of travel and also serves as a reference point to all the scales of this calculator. It can be made of several materials, preferably a transparent plastic that will allow greater view of map surfaces it is projected upon. Whatever a vendor may require in materials will not change the informative values.

Reference is hereby directed to the 11¼° points at their proper places around the entire 360° scale of the compass being printed upon the base material. This will aid in safety bearings, lighting rules at sea, position locator methods using bow and beam measurements, wind and current plotting procedures, etc. These 32 lines and markings are all important to the use and operation of the compass.

This base H, FIG. 1, features another object of the invention being different from all other plotting bases in having two methods of calculating and plotting courses. FIG. 1 shows the part marked on top port and starboard as having the lines of each point for 90° being carried to the outer part of part H. This will make using the point system very convenient, where the lines are drawn over the conventional plotting squares.

This dial H, FIG. 1, also shows a second arrow of travel at the other side of what has been outlined above, having a standard plotting base. If the navigator decides to use either of the two methods he will still read the degrees of difference in the same readout boxes provided on dials E, F and G, FIG. 1. This information is so arranged on the proper discs as to provide continuous reading. If the navigator still wishes to use the point system on this part, the points are each shown at the end of short lines that are symmetrical to the center line of the calculator. Therefore, anyone desiring to plot a course with either method merely places arms A and B, FIG. 3, in any desired position and reads the nautical miles on the arms A and B, and reads out the degree of change between any movement in the arms, which are designed to permit a centerline drawn between them.

The port and starboard reference is to the left and right when looking forward to the bow. They are expressions easily understood and standardized. By using the first or second position of the arrows of travel, all the parts of this calculator will be directed to the way chosen and will bear the same accuracy either way. Using wind and current charts, positioning methods all refer to the point method, that have been published for years and used widely by mariners everywhere.

Grommet K secures the various members together, allowing freedom of turning to permit calculations. Where grommets are used (as opposed to another method, or a rivet) it will be accompanied by a bolt or screw arrangement to fit the diameter of the grommet properly and having a shoulder that ends at a point where the five discs end. This bolt would then also have an extended thread to permit locking of the arms parts A and B, FIG. 3, together on the calculator. The arms already have a grommet and the bolt is of the right size to permit the correct tolerance allowing proper turning. The bolt could also be of a type made with a snap lock to facilitate the locking of the arms parts A and B, FIG. 3, to it accordingly. My opinion is the method serves best that employs a bolt as described.

Bolt assembly L is a bolt of proper diameter to fit the underneath flat side with minimum protrusion and having enough shank to fit the many parts herein and having a thread and nut or other locking method to secure the arms A and B, FIG. 3, to the base part H, FIG. 1, through the grommet K, FIG. 1.

Summary

Each part has been illustrated and explained functionally and, further, we have identified the use of this invention with safety: ship lighting, having two arms allowing calculation of movement of each part therein and having two drawing surfaces representing the center line accordingly, having mileage scales on it conforming to scaled maps widely used, correcting magnetic bearings, correcting compass courses and deviation, correcting variation for finding true bearings, using points of the compass as on a bearing board having a value as to position finding, wind and current plotting and facilitating the safety disc, having two choices of base components each having its value to a navigator, that can be used for boating or air navigation or wherever a magnetic compass is employed.

It should now be apparent that the broad teachings are applicable to an unusually wide range of information and arrangements for coordinating navigational data. This calculator embodies a two arm protractor that will assist the professional in his duties to lay courses and make measurements. All the parts have been described covering every single phase of important operations a navigator would regard as novel and having great utility.

It is obvious that minor changes may be made in the form and construction of this invention without departing from the spirit thereof. Naturally, it is desired to include all changes as come within the scope claimed.

I claim:

1. A navigation instrument comprising in combination: a transparent flat base member having a central pivot hole and inscribed with a set of rectangular grid lines, a set of lines extending radially of said pivot center toward the periphery of the base member and providing the divisions of a full circular angle scale numbered in nautical points, a lubber line mark and a diametrically opposite index mark on said scale, and two arcuate degree scales inwardly of said circular scale and concentric therewith, extending from respective zero points at 45° to the left and right of said lubber line mark;

a first disc member concentrically pivoted to said base member and of radius less than said circular angle scale and overlying said arcuate degree scale and marked at its periphery with a scale graduated in degrees including a zero mark to which magnetic variation may be referred and having two symmetrically placed cutouts at 45° right and left of its said zero mark and at a radial distance from said pivot hole for reading on respective ones of said arcuate scales the relative displacement of said first disc member and said base member;

a second disc member concentrically pivoted to said base member and overlying the central circular area of said first disc member that is inwardly of the cutouts in said first disc member, said second disc member being marked with a peripheral scale graduated in degrees and having a zero point to which magnetic compass deviation may be referred, and said second disc member having two arcuate degree scales inwardly of the peripheral scale thereon and concentric therewith and extending from respective zero points at 45° left and right of said zero point of said peripheral scale thereon;

a third disc member concentrically pivoted to said base member and overlying a central circular area whose periphery is between said peripheral scale on said second member and said two arcuate scales thereon, said third disc member being marked with a compass rose comprising a peripheral scale graduated in degrees, and having two symmetrically placed cutouts at 45° right and left of the north point of said compass rose and at a radial distance from said pivot hole for reading on respective ones of said arcuate scales on said second disc the relative displacement of said third disc and said second disc; and a pivot element extending through the pivot hole in said base member and through coaxial pivot holes in the disc members and retaining them in juxtaposed concentric relatively rotatable relation.

2. A navigation instrument as set forth in claim 1 and also comprising at least one further disc member concentrically pivoted to said base member and smaller than and overlying said third disc member, each of said further disc members being marked on its periphery with a pair of lubber line arrows 180° apart, each pair representing the direction of a navigational vector.

3. A navigational instrument as set forth in claim 1 and further comprising two protractor arms of transparent material mounted on said pivot means over said disc members for independent rotation, each of said arms having a straightedge eligned with the pivot axis and marked therealong with sets of distance scales; one of said arms bearing a degree scale concentric with the pivot axis and the other of said arms having index means for reading against said last named degree scale the angle between said straight edges.

* * * * *